United States Patent [19]
Uno et al.

[11] Patent Number: 5,530,583
[45] Date of Patent: Jun. 25, 1996

[54] OPTICAL SIGNAL AMPLIFICATION APPARATUS AND AN OPTICAL FIBER TRANSMISSION SYSTEM USING THE SAME

[75] Inventors: Tomoaki Uno, Kobe; Jun Ohya, Osaka; Katsuyuki Fujito, Higashiosaka, all of Japan

[73] Assignee: Matsushita Electric Industrial Co., Ltd., Osaka, Japan

[21] Appl. No.: 342,437

[22] Filed: Nov. 18, 1994

[30] Foreign Application Priority Data

Nov. 18, 1993 [JP] Japan ..................... 5-289017
Dec. 16, 1993 [JP] Japan ..................... 5-316288

[51] Int. Cl.$^6$ ..................................... H01S 3/00
[52] U.S. Cl. ........................... 359/341; 359/337
[58] Field of Search ..................... 359/341, 337

[56] References Cited

U.S. PATENT DOCUMENTS

| | | | |
|---|---|---|---|
| 5,050,949 | 9/1991 | DiGiovanni et al. | 359/341 |
| 5,117,303 | 5/1992 | Desurvire et al. | 359/341 |
| 5,282,079 | 1/1994 | Laming et al. | 359/341 |
| 5,400,165 | 3/1995 | Gnauck et al. | 359/341 |
| 5,406,410 | 4/1995 | Hanna et al. | 372/6 |

OTHER PUBLICATIONS

K. Kikushima and H. Yoshinaga, "Distortion Due to Gain Tilt of Erbium–Doped Fiber Amplifiers", IEEE Photonics Technology Letters, vol. 3, No. 10, Oct. 1991, pp. 945–947.

Jun Ohya, Hisanao Sato, and Toshihiro Fujita, "Cancellation of Second–Order Distortion of Directly Modulated Laser in Erbium–Doped Fiber Amplifier", IEEE Photonics Technology Letters, vol. 4, No. 4, Apr. 1993, pp. 414–416.

Etsugo Yoneda, Ko–ichi Suto; Koji Kikushima and Hisao Yoshinaga, "All–Fiber Video Distribution (AFVD) Systems Using SCM and EDFA Techniques", Journal of Lightwave Technology, vol. II, No. 1, Jan. 1993, pp. 128–137.

*Primary Examiner*—Mark Hellner
*Attorney, Agent, or Firm*—Ratner & Prestia

[57] ABSTRACT

The optical signal amplification apparatus of this invention includes a plurality of optical fiber amplifiers connected in series, each optical fiber amplifier including: an optical fiber doped with rare earth ions; and a pumping light source for emitting pumping light for exciting the optical fiber, wherein the power of signal light input into each optical fiber amplifier is set so that the value of a distortion component of the signal light output from the optical fiber amplifier is equal to the value of a distortion component of the signal light input into the optical fiber amplifier and that the distortion component of the signal light output from the optical fiber amplifier increases when the power of the signal light input into the optical fiber amplifier increases. An optical fiber transmission system including the optical signal amplification device is also provided.

25 Claims, 19 Drawing Sheets

5,530,583

OPTICAL SIGNAL AMPLIFICATION APPARATUS AND AN OPTICAL FIBER TRANSMISSION SYSTEM USING THE SAME

BACKGROUND OF THE INVENTION

1. Field of the Invention

The present invention relates to an optical signal amplification apparatus and an optical fiber transmission system employing the optical signal amplification apparatus. More specifically, the present invention relates to an optical signal amplification apparatus including a plurality of amplifiers connected in series and an optical fiber transmission system employing such an optical signal amplification apparatus.

2. Description of the Related Art

In recent years, an erbium-doped optical fiber amplifier capable of directly amplifying light of a 1550 nm band has been realized. With this realization, an analog optical fiber transmission system employing such an optical fiber amplifier has been studied and developed.

FIG. 20 shows a configuration of an analog optical fiber transmission system of a 1550 nm band employing a conventional optical fiber amplifier. The system includes a DFB (distributed feedback) semiconductor laser 110 having an oscillation wavelength of 1550 nm, an erbium-doped optical fiber amplifier 120 pumped by a semiconductor laser having an oscillation wavelength of 1480 nm, a 1×10 optical coupler 130, a dispersion shifted optical fiber 140 of a 1550 nm band, and a light-receiving element 150 made of an InGaAs photodiode or an avalanche photodiode.

In the DFB semiconductor laser 110, the power of signal light is modulated according to an AM-FDM (frequency division multiplexer) or FM-FDM analog signal. Signal light output from the DFB semiconductor laser 110 is amplified by the optical fiber amplifier 120, and branched by the optical coupler 130. Thereafter, the signal light is transmitted through the dispersion shifted optical fiber 140 and then input into the light-receiving element 150.

Since the erbium-doped optical fiber amplifier 120 has a high gain in the 1550 nm band, it is possible to construct an entirely optical distribution system where a signal is optically transmitted through the entire route from a head end to the respective users' homes. This makes it possible to distribute images covering 100 channels or more and high-definition TV images.

In the above optical fiber transmission system employing the fiber optical amplifier, it is known that, when AM-FDM or FM-FDM analog signal light is transmitted therein, a distortion of the signal light, especially, a distortion component based on second-order nonlinearity called a composite second order (CSO), is increased during the transmission through the optical fiber amplifier. This is reported, for example, by Kikushima et al. "IEEE Photonics Technology Letters" 1991, pp. 945–947.

When the power of signal light output from a semiconductor laser is intended to be analog-modulated, not only the power of the signal light but also the frequency thereof are modulated. This is called chirping. When the signal light having a modulated frequency is amplified by the optical fiber amplifier having a gain dependent on the wavelength of the signal light, the variation in the frequency of the signal light brings about a variation in the power thereof. This results in shifting of the power of the signal light from a desired level. In other words, since the gain of the optical fiber amplifier has a great wavelength-dependency (a gain tilt) in the wavelength band of signal light (for example, the 1550 nm band), the variation in the frequency of the signal light causes a shift of the power thereof from a desired level.

Such a distortion generated by one optical fiber amplifier is possibly multiplied when the signal light is transmitted through a plurality of optical fiber amplifiers connected in series.

SUMMARY OF THE INVENTION

The optical signal amplification apparatus of this invention includes a plurality of optical fiber amplifiers connected in series, each optical fiber amplifier including: an optical fiber doped with rare earth ions; and a pumping light source for emitting pumping light for exciting the optical fiber, wherein the power of signal light input into each optical fiber amplifier is set so that the value of a distortion component of the signal light output from the optical fiber amplifier is equal to the value of a distortion component of the signal light input into the optical fiber amplifier and that the distortion component of the signal light output from the optical fiber amplifier increases when the power of the signal light input into the optical fiber amplifier increases.

In one example, each optical fiber amplifier comprises a variable power adjuster connected to at least the input of the optical fiber amplifier, and the variable power adjuster adjusts the power of the signal light to be input into the optical fiber amplifier.

In another example, the signal light is laser light obtained by modulating light in a distributed feedback semiconductor laser with an oscillation wavelength of 1550 nm using an analog signal current, and the optical fiber is doped with erbium ions as the rare earth ions.

In yet another example, each optical fiber amplifier further comprises a wavelength coupler disposed between the optical fiber and the pumping light source for optically coupling the pumping light with the optical fiber.

According to another aspect of the present invention, an optical signal amplification apparatus is provided, which includes a plurality of optical fiber amplifiers connected in series, each optical fiber amplifier including: an optical fiber doped with rare earth ions; and a pumping light source for emitting pumping light for exciting the optical fiber, wherein the optical fiber is made of a fiber having an absorption cross section and an emission cross section where the differential coefficients of the wavelength-dependency curves of the absorption cross section and the emission cross section are substantially zero for a predetermined wavelength.

According to yet another aspect of the present invention, an optical fiber transmission system is provided which includes: an optical fiber transmission route including the optical signal amplification apparatus according to the first aspect of the present invention; a signal light generation device for emitting signal light in response to an analog signal current and inputting the signal light into the optical fiber transmission route; and a light-receiving device for converting the signal light into an electric signal, wherein the signal light emitted from the signal light generation device is transmitted through the optical fiber transmission route and then received by the light-receiving device.

According to yet another aspect of the present invention, an optical fiber transmission system is provided which includes: an optical fiber transmission route including the optical signal amplification apparatus according to the second aspect of the present invention; a signal light generation device for emitting signal light in response to an analog signal current and inputting the signal light into the optical fiber transmission route; and a light-receiving device for converting the signal light into an electric signal, wherein the signal light emitted from the signal light generation device is transmitted through the optical fiber transmission route and then received by the light-receiving device.

According to yet another aspect of the present invention, an optical signal amplification apparatus having a plurality of optical fiber amplifiers connected in series, each optical fiber amplifier including: an optical fiber doped with rare earth ions; and a pumping light source for emitting pumping light for exciting the optical fiber, wherein signal light input into each optical fiber amplifier has substantially the same power, and the wavelength of the signal light is in the range of wavelengths where the absolute value of a gain tilt of the optical signal amplification apparatus for modulated light is 0.15 dB/nm or less.

In one example, the optical fibers of the optical fiber amplifiers have substantially the same length and substantially the same ion concentration and are excited by pumping light having substantially the same power.

In another example, at least one of the optical fiber amplifiers has a length or an ion concentration different from the other optical fiber amplifiers.

In yet another example, the power of pumping light input into at least one of the optical fiber amplifiers is different from that of pumping light input into the other optical fiber amplifiers.

In yet another example, the signal light is laser light of a 1550 nm band emitted from a semiconductor laser, and erbium is used as the rare earth ions doped in the optical fiber.

In yet another example, the signal light is laser light of a 1300 nm band emitted from a semiconductor laser, and praseodymium is used for the rare earth ions doped in the optical fiber.

According to yet another aspect of the present invention, an optical signal amplification apparatus having a plurality of optical fiber amplifiers connected in series, each optical fiber amplifier including: an optical fiber doped with rare earth ions; and a pumping light source for emitting pumping light for exciting the optical fiber, wherein the signal light input into at least one of the optical fiber amplifiers has a power different from that of the signal light input into the other optical fiber amplifiers, and the wavelength of the signal light is in a range of wavelengths where the absolute value of a gain tilt of the optical signal amplification for modulated light is 0.3 dB/nm or less.

In one example, the optical fibers of the optical fiber amplifiers have substantially the same length and substantially the same ion concentration and are excited by pumping light having substantially the same power.

In another example, at least one of the optical fiber amplifiers has a length or an ion concentration different from the other optical fiber amplifiers.

In yet another example, the power of pumping light input into at least one of the optical fiber amplifiers is different from that of pumping light input into the other optical fiber amplifiers.

In yet another example, the signal light is laser light of a 1550 nm band emitted from a semiconductor laser, and erbium is used as the rare earth ions doped in the optical fiber.

In yet another example, the signal light is laser light of a 1300 nm band emitted from a semiconductor laser, and praseodymium is used for the rare earth ions doped in the optical fiber.

According to yet another aspect of the present invention, an optical fiber transmission system comprising: a semiconductor laser for emitting signal light intensity-modulated by a multi-channel analog electric signal; an optical signal amplification apparatus according to claim 8 for amplifying the signal light emitted from the semiconductor laser; an optical fiber for transmitting the signal light amplified by the optical signal amplification apparatus; and a light-receiving device for converting the signal light transmitted through the optical fiber into an electric signal.

According to the present invention, the relationships of the power and the wavelength of signal light with the variation in the CSO distortion of the signal light generated by an optical fiber amplifier have been studied to realize the construction of a system where the distortion of signal light is not accumulatively increased when the signal light is transmitted through a plurality of optical fiber amplifiers connected in series.

The inventors have found that the CSO distortion of signal light does not change after the transmission of the signal light through an optical fiber amplifier by appropriately selecting the power of the signal light emitted from a light source. It was also found that there is a case where, even when the CSO distortion does not change after the transmission of the signal light through the optical fiber amplifier, a distortion is actually generated by the optical fiber amplifier. In such a case, the distortion may increase when the signal light is transmitted through a plurality of optical fiber amplifiers connected in series.

According to the present invention, based on the relationship between the power of signal light and the distortion thereof, the CSO distortion generated by the optical fiber amplifier itself is made zero by setting the power of the signal light input into the optical fiber amplifier at a predetermined level. As a result, according to one optical signal amplification apparatus of the present invention including a plurality of optical fiber amplifiers, such an increase in the distortion of the signal light by the optical fiber amplifiers is prevented.

The CSO distortion is expressed by the product of the gain tilt and the degree of chirping. According to another embodiment of the optical signal amplification apparatus of the present invention, the gain tilt is made substantially zero by setting the wavelength of the signal light at a level where the differential coefficients of the absorption cross section and the emission cross section of an optical fiber are substantially zero.

Further, the inventors have confirmed by calculation that the absolute value of the gain tilt can be kept at or lower than a predetermined level by setting the wavelength of the signal light within a predetermined range. According to yet another embodiment of the optical signal amplification apparatus of the present invention, based on the results obtained by the above calculation, the wavelength of the signal light is set within an appropriate predetermined range, so as to obtain an absolute value of the gain tilt equal to or lower than a required level. Alternatively, the power of the signal light input into at least one of the optical fiber amplifiers may be changed from that input into the other optical fiber amplifiers. In such a case, the relationship between the wavelength of the signal light and the gain tilt for the former becomes different from that for the latter. Based on this difference, the wavelength range of the signal light can be appropriately selected in a wider variety.

Thus, the invention described herein makes possible the advantages of (1) providing an optical signal amplification apparatus including a plurality of optical fiber amplifiers connected in series, in which the distortion of signal light is suppressed to a level of that of the original signal light after the transmission of the signal light through the optical fiber amplifiers, and (2) providing an optical fiber transmission system employing such an optical signal amplification apparatus.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
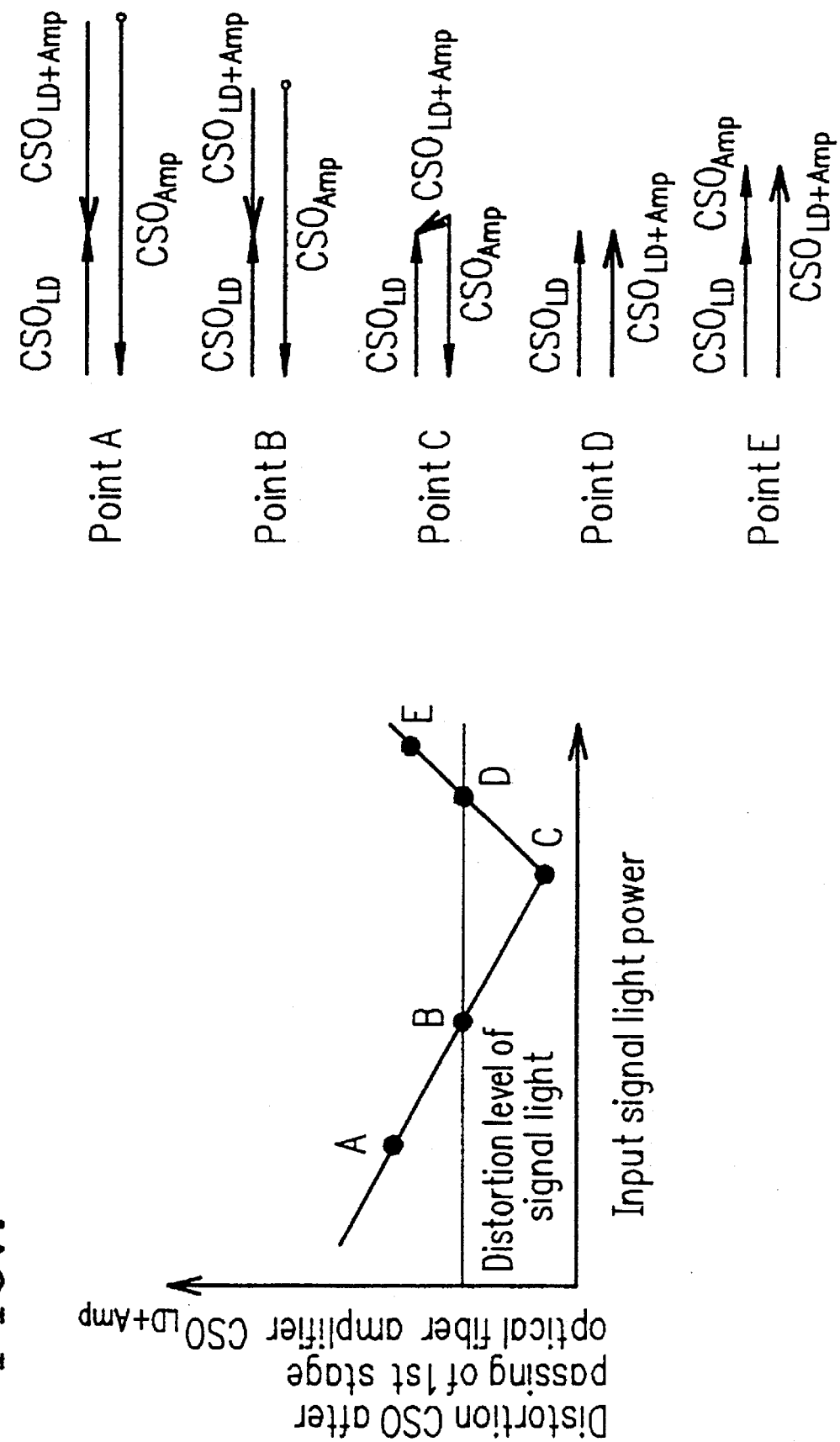
FIG. 1 shows the principle of the present invention.

Referring to FIG. 1, the principle of one aspect of the present invention will be described.

The graph of FIG. 1 shows how the distortion of signal light amplified by one optical fiber amplifier varies depending on the power of the signal light input into the optical fiber amplifier (hereinafter, such power is referred to as the input signal light power). This dependency of the distortion of the signal light on the input signal light power occurs because the gain peak wavelength of the optical fiber amplifier shifts toward a longer wavelength with the increase of the input signal light power (This is theoretically reported by Ohya et al. "IEEE, Photonics Technology Letters, 1993, pp. 414–416, for example).

As theoretically predicted, the distortion characteristic (the dependency of the distortion on the input signal light power) shown in the graph of FIG. 1 greatly depends on the phase difference between the power modulation and the phase modulation of signal light when the signal light is modulated at a signal light source. However, the inventors have experimentally confirmed that for a DFB semiconductor laser of the kind used as a signal light source for analog transmission, such a phase difference between the power modulation and the phase modulation has a certain relationship with each other. This is because the DFB semiconductor laser used for analog transmission is designed to form a low $\kappa L$ structure where the coupling between a diffraction grating of the semiconductor laser and laser light is weak, so as to suppress a hole-burning effect in the axial direction.

The distortion at each of points A, B, C, D, and E of the input signal light power shown in the graph of FIG. 1 can be expressed as illustrated on the right side of FIG. 1, where a distortion generated by the semiconductor laser ($CSO_{LD}$), a distortion generated by the optical fiber amplifier ($CSO_{Amp}$), and a distortion measured after the amplification by the optical fiber amplifier ($CSO_{LD+Amp}$) are expressed as vectors having a phase and a magnitude. The distortion $CSO_{LD+Amp}$ is obtained by synthesizing the distortions $CSO_{LD}$ and $CSO_{Amp}$ as vectors. The distortions $CSO_{LD}$ and $CSO_{LD+AMP}$ can be directly measured quantitatively by converting the light signal into an electric signal. However, the distortion $CSO_{Amp}$ cannot be directly measured.

Referring to FIG. 1, though the distortion $CSO_{LD+Amp}$ at the point C is smaller than the distortion $CSO_{LD}$ generated by the semiconductor laser, the distortion $CSO_{Amp}$ generated by the optical amplifier is not zero. At the point B, since the distortion $CSO_{LD+Amp}$ is equal to the distortion $CSO_{LD}$ generated by the semiconductor laser, the distortion $CSO_{Amp}$ appears to be zero. In reality, however, the distortion $CSO_{Amp}$ is not zero but a distortion expressed by a vector having a double magnitude and an opposite direction compared with the distortion $CSO_{LD}$ and a direction opposite to that thereof. The point D is the point where the distortion $CSO_{Amp}$ is zero. The point D is automatically determined upon the determination of a wavelength, independently of the level of the distortion and the degree of chirping (the degree to which the frequency is modulated) generated by the semiconductor laser as a signal light source. At the points A and E, the distortion $CSO_{LD+Amp}$ is greater than the distortion $CSO_{LD}$ originally generated by the semiconductor laser. As a result, in the configuration including a plurality of optical fiber amplifiers connected in series, the same distortion characteristic as the original distortion $CSO_{LD}$ generated by the semiconductor laser can be obtained independently of the number of optical fiber amplifiers because $CSO_{LD+Amp}=0$ is obtained only at and around the point D. At the other points A, B, C, and E, the distortion characteristic depends on the number of optical fiber amplifiers and is generally lower than that of the semiconductor laser.

Figure 2:
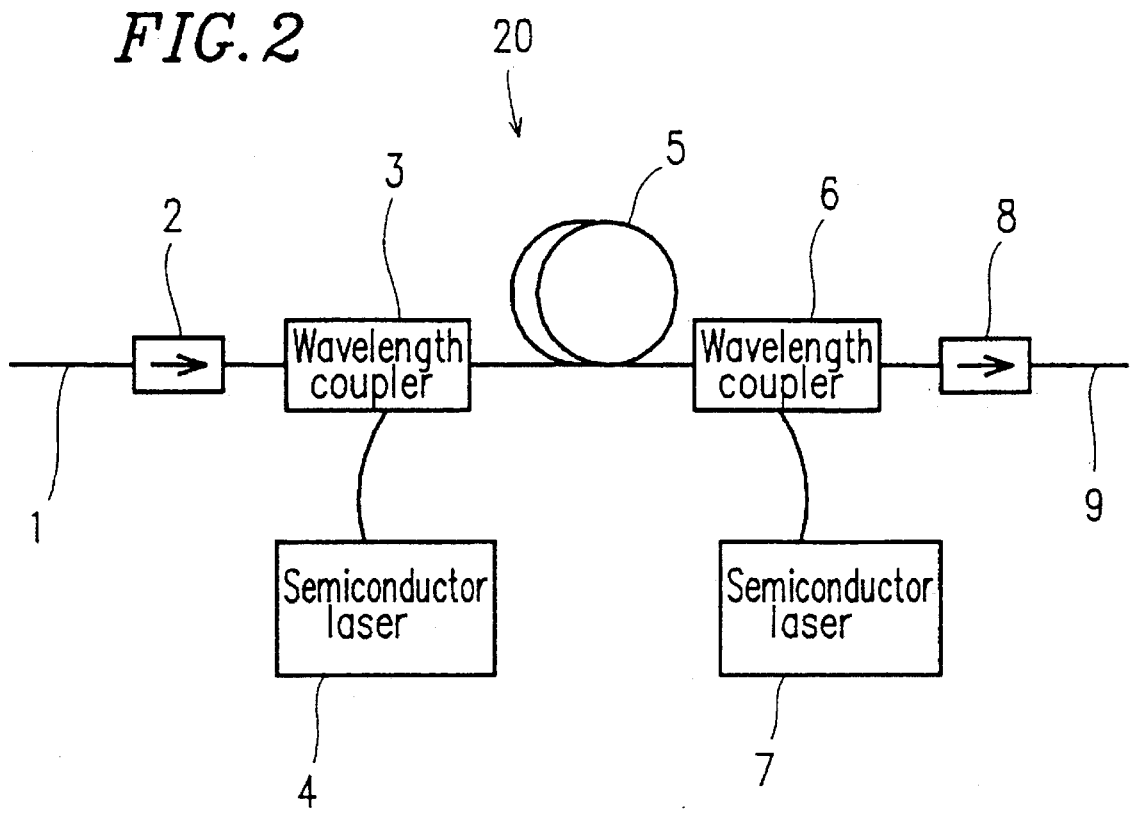
FIG. 2 is a block diagram of an optical fiber amplifier used for an optical signal amplification apparatus according to the present invention.

Now, a first example of the present invention will be described with reference to FIGS. 2 to 4. FIG. 2 schematically shows an optical fiber amplifier 20 used for an optical signal amplification apparatus according to the present invention. The optical fiber amplifier 20 is applicable, for example, to a multidistribution optical fiber transmission system of a 1550 nm band.

The optical fiber amplifier 20 includes an erbium-doped optical fiber 5 having a length of 50 m, and semiconductor lasers 4 and 7 for emitting pumping light of a 1480 nm band. Signal light 1 having a wavelength of 1550 nm is introduced into the optical fiber 5 through an optical isolator 2 and amplified while transmitting through the optical fiber 5. This amplification is caused because the erbium-doped optical fiber 5 possesses a gain over the signal light 1 obtained by being excited by the pumping light of a 1480 nm band. Thus, when signal light with a power of 6 dBm is input, the optical output power of 18 dBm is obtained.

First pumping light for exciting the erbium-doped optical fiber 5 is emitted from the semiconductor laser 4 and introduced into the input of the optical fiber 5 through a wavelength coupler 2. Second pumping light emitted from the semiconductor laser 7 is introduced into the output of the optical fiber 5 through a wavelength coupler 6. The two types of pumping light are transmitted through the optical fiber 5 in the opposite directions. The signal light which has passed the wavelength coupler 6 is output through an optical isolator 8 as output light 9.

The amount of erbium doped in the optical fiber 5 used in this example is 3000 ppm, while the amount of aluminum doped therein is 8000 ppm. The output light 9 which has been amplified by the erbium-doped optical fiber 5 and has passed through the wavelength coupler 6 and the optical isolator 8 is then input into a next optical fiber amplifier (not shown) disposed subsequent to the optical fiber amplifier 20.

Figure 3:
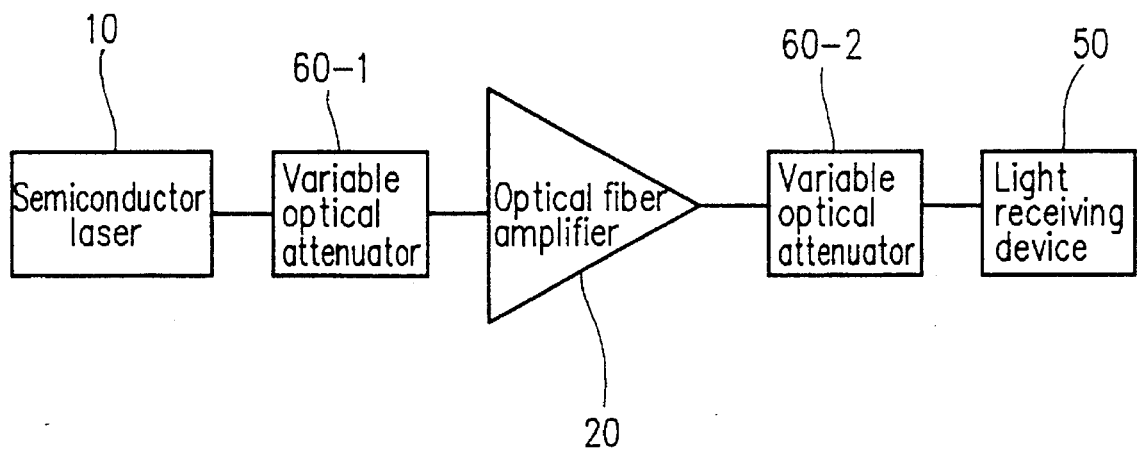
FIG. 3 is a block diagram of a system including the optical fiber amplifier of FIG. 2.

FIG. 3 is a block diagram of a system with a simple configuration including the optical fiber amplifier 20 of FIG. 2. Using this system, an "optimal" input signal light power for the optical fiber amplifier 20 was measured. The "optimal" input signal light power as used herein refers to the power of input signal light at which the distortion of the signal light generated by one optical fiber amplifier 20 is zero, and as a result, the distortion of the signal light output from the optical fiber amplifier 20 is the same as the original distortion of the signal light. That is, the optimal input signal light power corresponds to the point D of FIG. 1 described above.

In order to obtain a precise optimal input signal light power, variable optical attenuators 60-1 and 60-2 are disposed in front of and at the back of the optical fiber amplifier 20. Signal light emitted from a semiconductor laser 10 is analog-modulated by controlling a current for driving the semiconductor laser 10. While keeping stable analog-modulation, the power of the signal light to be input into the optical fiber amplifier 20 is varied by the optical attenuator 60-1. At this time, the optical output power from the optical fiber amplifier 20 is also varied. The optical attenuator 60-2 is adjusted so as to compensate the variation and thus to stabilize the optical output power to be output to a light-receiving element 50. This operation is conducted to obtain identical measurement conditions because a distortion generated by the light-receiving element 50 has a dependency on the input signal light power.

Figure 4:
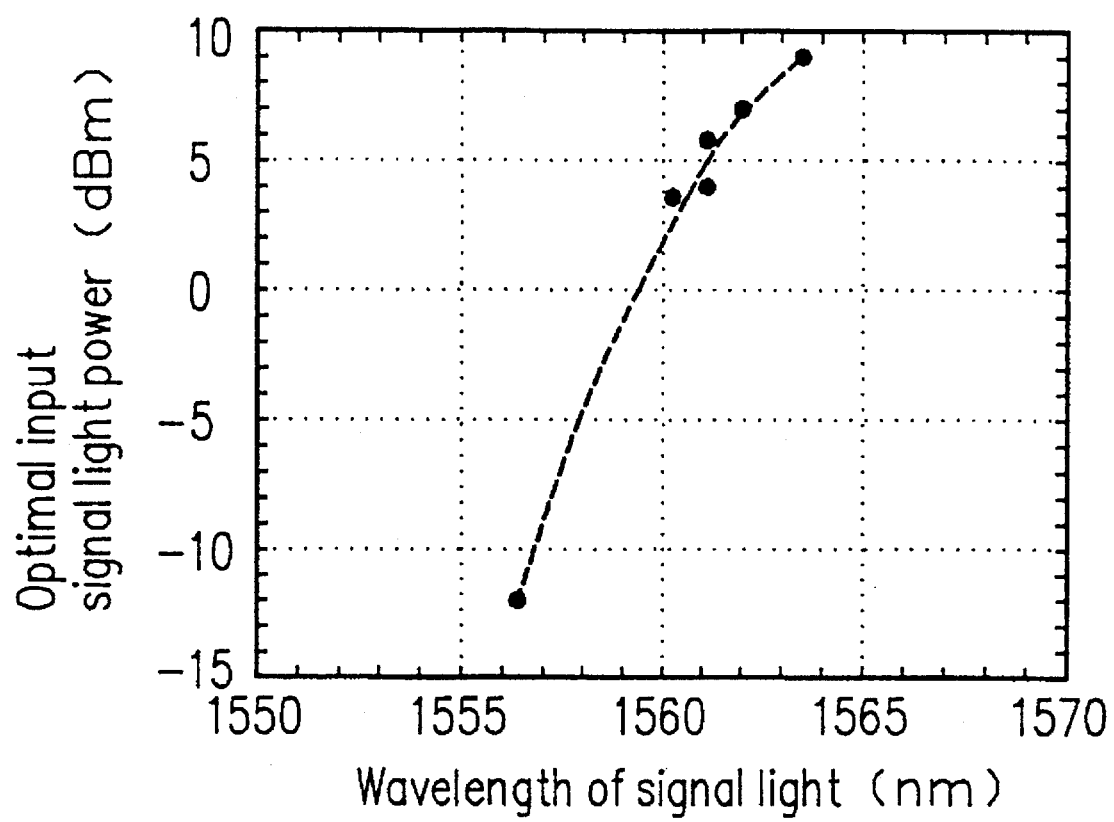
FIG. 4 is a graph showing the wavelength-dependency of the optimal input signal light power.

FIG. 4 is a graph showing the wavelength-dependency of the optimal input signal light power. The optimal input signal light power becomes greater as the wavelength of the signal light shifts toward a longer wavelength. This is because as the input signal light power is greater the gain of the erbium-doped optical fiber becomes more saturated, resulting in the shift of the gain peak toward a longer wavelength.

When the wavelength of the signal light and the power thereof satisfy the relationship shown in FIG. 4, the distortions of the signal light input into and output from the optical fiber amplifier 20 are the same independently of the level of the distortion and the degree of chirping generated by the semiconductor laser 10. More specifically, the distortions of the signal light input into and output from the optical fiber amplifier 20 were the same when the frequency of the signal from the semiconductor laser 10 was modulated in the range of 1 GHz or less, or when the number of carriers of the signal was modulated in the range of 2 to 42 channels. This indicates that a distortion of the signal light will not be generated by the optical fiber amplifier 20 when the signal is amplified as far as the relationship between the wavelength of the signal light and the power thereof is appropriately adjusted. It should be understood that, since the relationship between the optimal input signal light power and the wavelength of the signal light shown in FIG. 4 was obtained under the conditions of this example, the relationship will vary depending on the condition and method of the excitation of the optical fiber amplifier 20, the composition of the optical fiber, and the like.

In this example, the optical fiber was excited by the pumping light with a wavelength of 1480 nm. However, pumping light of a 800 nm band or a 980 nm band may also be used. Similar results are also obtained by using an optical fiber doped with rare earth elements other than erbium, such as neodymium, praseodymium, thulium, ytterbium, and dysprosium, and other impurity elements such as aluminum, fluorine, and phosphorus, as far as appropriate wavelengths for the pumping light and the signal light can be selected.

EXAMPLE 2

An optical signal amplification apparatus as the second example according to the present invention will be described with reference to FIGS. 5 and 6.

Figure 5:
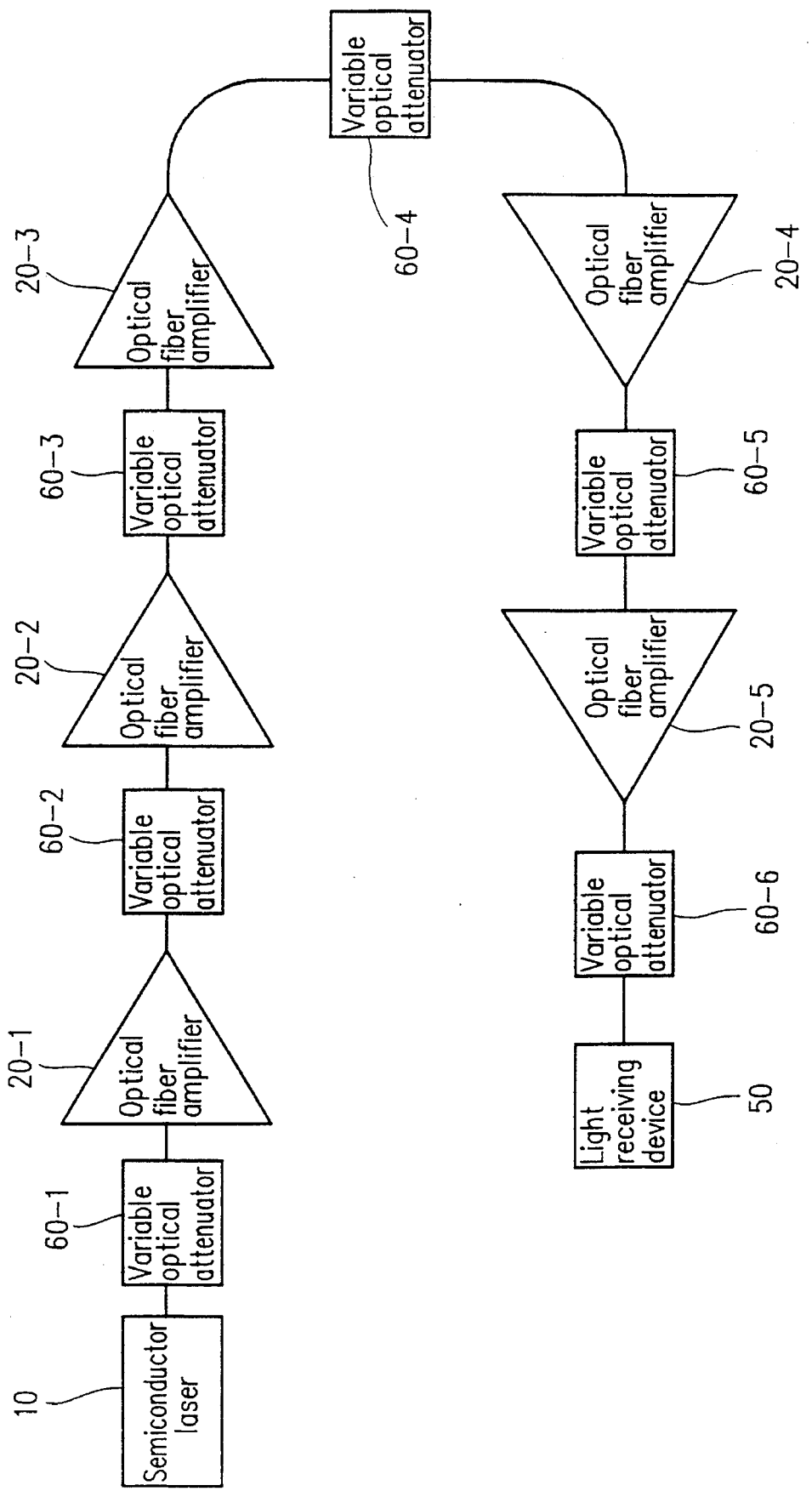
FIG. 5 is a block diagram of an optical signal amplification apparatus according to the present invention.

Referring to FIG. 5, the optical signal amplification apparatus of this example includes five optical fiber amplifiers 20-1, 20-2, 20-3, 20-4, and 20-5 connected in series. Each of the optical fiber amplifiers 20-1 to 20-5 has the same configuration as the optical fiber amplifier 20 of FIG. 2 described in Example 1. Variable optical attenuators (variable power adjusters) 60-1, 60-2, 60-3, 60-4, 60-5, and 60-6 are disposed between the adjacent optical fiber amplifiers 20-1 to 20-5. The optical signal amplification apparatus receives signal light emitted from a semiconductor laser 10 at the input thereof and outputs the signal light to a light-receiving device 50 at the output thereof. In this example, a DFB semiconductor laser emitting signal light with a wavelength of 1560.3 nm is used for the semiconductor laser 10. As is observed from FIG. 4, the optimal power of the signal light with the wavelength of 1560.3 nm is 3 dBm. Accordingly, in this example, the signal light power input into each of the optical fiber amplifiers 20-1 to 20-5 is adjusted to 3 dBm.

Figure 6:
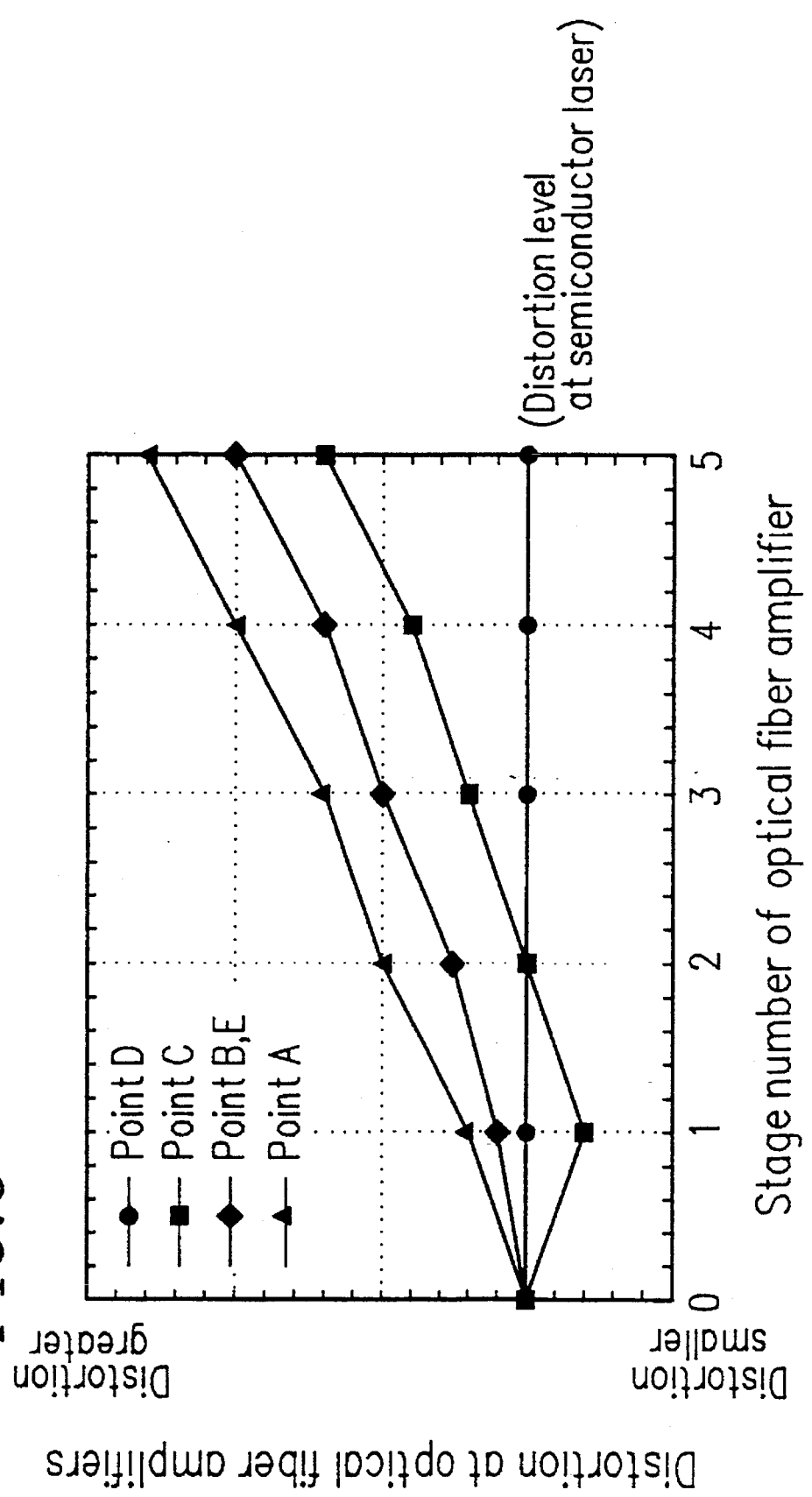
FIG. 6 is a graph showing the distortion generated by each of a plurality of optical fiber amplifiers connected in series.

FIG. 6 shows how the distortion of the signal light varies when the signal light is transmitted through a plurality of optical fiber amplifiers for each of the powers of the signal light, −10 dBm, −5 dBm, 0 dBm, 3 dBm, and 6 dBm, which correspond to the points A, B, C, D, and E shown in FIG. 1, respectively. In FIG. 6, the marks ● ■ ♦ ▲ denote the points D, C, B and E, and A, respectively. As is apparent from FIG. 6, in the case of the point D (input power: 3 dBm), the distortion of the signal light did not change after the transmission of the signal light through the respective optical fiber amplifiers, causing the least distortion at the final stage.

In the experiment conducted to obtain the graph of FIG. 6, the analog modulation of the signal light emitted from the semiconductor laser 10 was kept fixed, and the power of the signal light input into the light-receiving element 50 was kept at a fixed level, so as to eliminate any influence of distortion characteristics possessed by the semiconductor laser 10 and the light-receiving element 50. Also, the powers of the signal light input into the respective optical fiber amplifiers 20-1 to 20-5 were made identical to one another by adjusting the respective optical attenuators 60-1 to 60-6.

In the cases of the point A (input power: −10 dBm), the point B (input power: −5 dBm), and the point E (input power: 6 dBm), the distortion generated by the optical fiber amplifier is not zero, as described with reference to FIG. 1. Accordingly, in these cases, as the number of optical fiber amplifiers 20 increased, the distortion of the signal light accumulatively increased. In the case of the point C (input power: 0 dBm), the distortion was smaller than that generated by the semiconductor laser 10 at the first optical fiber amplifier 20-1, but at the subsequent optical fiber amplifiers 20-2 to 20-5, the distortion accumulatively increased. As a result, at the final stage after the fifth optical fiber amplifier 20-5, the distortion was greater than that generated by the semiconductor laser by 10 dB or more.

From the above results, according to the optical signal amplification apparatus of this example, it is possible to amplify and transmit signal light through a plurality of optical fiber amplifiers connected in series without increasing the distortion of the signal light.

EXAMPLE 3

An optical signal amplification apparatus as the third example according to the present invention will be described with reference to FIG. 7.

The configuration of optical fiber amplifiers used in the optical signal amplification apparatus of this example is substantially the same as that described in Example 1 referring to FIG. 2. In this example, however, an optical fiber with a length of 50 m doped with 3000 ppm of erbium and 3000 ppm of germanium dioxide is used as the optical fiber 5.

Figure 7:
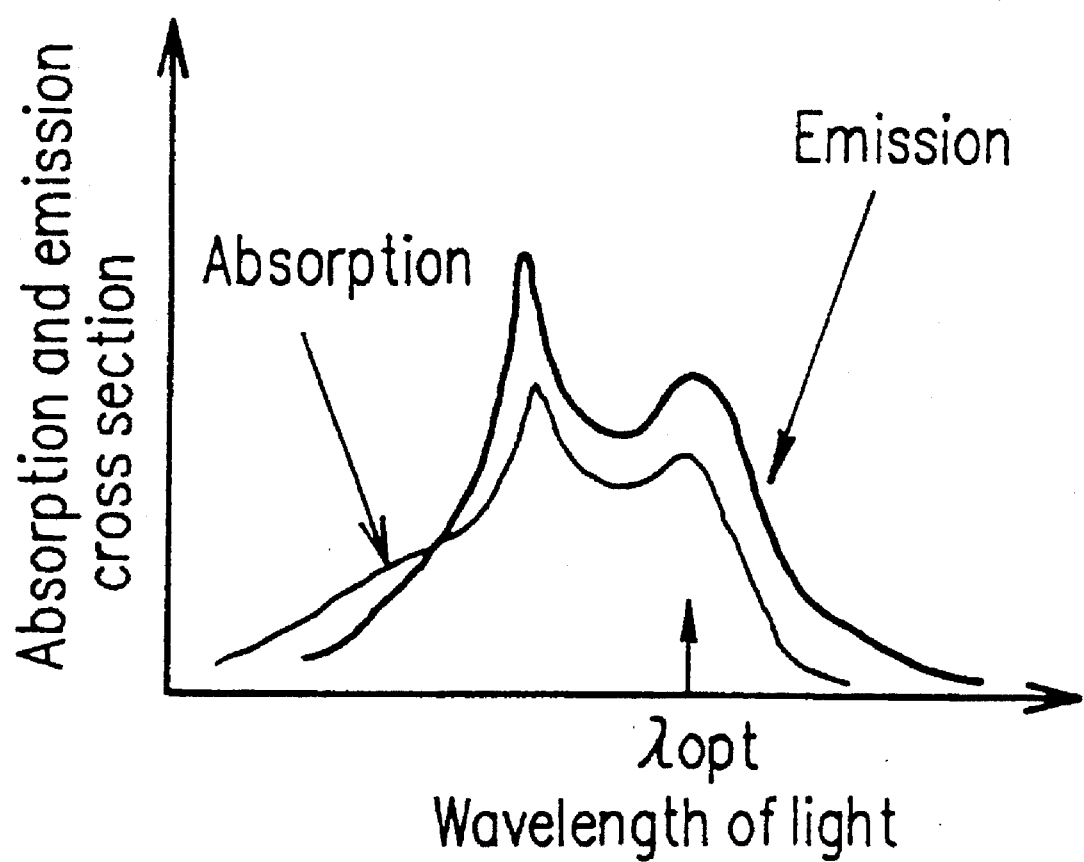
FIG. 7 is a graph showing the wavelength-dependency of the absorption cross section and the emission cross section of an optical fiber.

FIG. 7 shows curves of the dependencies of the absorption cross section (shown by the fine solid line) and the emission cross section (shown by the bold solid line) of the erbium-doped optical fiber used in this example on the wavelength of signal light. In the erbium-doped optical fiber of this example, the differential coefficients of the wavelength-dependency curves of the absorption cross section and the emission cross section are both zero when the wavelength is approximately 1550 nm. Such a wavelength of the signal light where the differential coefficients of the both curves are zero is hereinafter referred to as the optimal wavelength $\lambda_{opt}$. When light with a power of 3 dBm is input into an optical fiber amplifier using the above optical fiber, the optical output power obtained was 15 dBm.

The distortion characteristic of the optical fiber amplifier of this example was evaluated using the system of FIG. 3. In the evaluation, signal light emitted from the DFB semiconductor laser 10 having an oscillation wavelength of 1550 nm band was analog-modulated under fixed conditions. The power modulation of the signal light to be input into the optical fiber amplifier 20 was adjusted by the optical attenuator 60-1, while the power of the signal light output to the light-receiving element 50 was kept at a fixed level by the optical attenuator 60-2.

As a result, it was found that the measured distortion did not vary depending on the power of the signal light input into the optical fiber amplifier 20 and was the same as that generated by the semiconductor laser 10 for any of the powers of the input signal light tested.

In this example, the optical fiber doped with 3000 ppm of erbium and 3000 ppm of germanium dioxide was used. However, other optical fibers doped with rare earth elements other than erbium, such as neodymium, praseodymium, thulium, ytterbium, and dysprosium, and other impurity elements such as aluminum, fluorine, and phosphorus may be used. With such optical fibers, the optimal wavelength $\lambda_{opt}$ where the differential coefficients of the wavelength-dependency curves of the absorption cross section and the emission cross section are both zero can also be obtained as far as an appropriate composition is selected for the optical fiber. By using the signal light with the optimal wavelength $\lambda_{opt}$, the same effects as those obtained in this example can be obtained.

EXAMPLE 4

An analog optical fiber transmission system as the fourth example according to the present invention will be described with reference to FIGS. 8 and 9.

Figure 8:
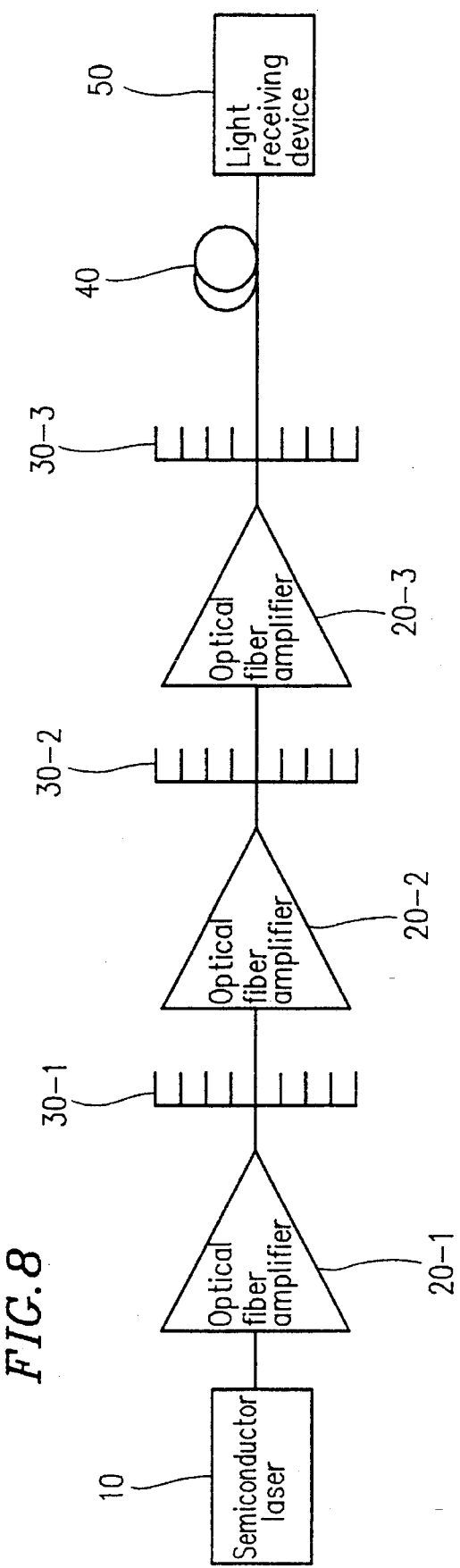
FIG. 8 is a block diagram of an optical fiber transmission system according to the present invention.

Referring to FIG. 8, the optical fiber transmission system of this example includes a semiconductor laser 10, a plurality of optical fiber amplifiers 20-1, 20-2, and 20-3 connected in series, 1×16 optical couplers 30-1, 30-2, and 30-3 disposed between the adjacent optical fiber amplifiers 20-1 to 20-3, a single-mode optical fiber 40, and a light-receiving element 50.

Each of the optical fiber amplifiers 20-1 to 20-3 has the same configuration as the optical fiber amplifier 20 of FIG. 2 described in Example 1. That is, it includes an erbium-doped optical fiber and semiconductor lasers emitting pumping light of a 1480 nm band for exciting the optical fiber. Signal light emitted from the semiconductor laser 10 is first amplified by the optical fiber amplifier 20-1 and then branched by the 1×16 coupler 30-1. This operation is repeated by the optical fiber amplifiers 20-2 and 20-3 and the 1×16 couplers 30-2 and 30-3 so as to effect multi-distribution. The optical fiber 40 is a 10 km long dispersion shift optical fiber in the 1550 nm band.

A DFB semiconductor laser having an oscillation wavelength of 1560.3 nm was used as the semiconductor laser 10, the output of which was set at 3 dBm. Signal light from the semiconductor laser 10 was modulated according to an NTSC system 12-channel TV signal. The modulation factor per channel was approximately 12%.

The power of the signal light input into each of the optical fiber amplifiers 20-1, 20-2, and 20-3 is set at 3 dBm, a value obtained by subtracting a loss produced due to the branching of the signal light by the coupler, and an excessive loss (total loss: 15 dB) from the amplified output power, 18 dBm. This power of the signal light (3 dBm) is identical to the optimal input signal light power (see FIG. 4) for the oscillation wavelength of the semiconductor laser 10.

Figure 9:
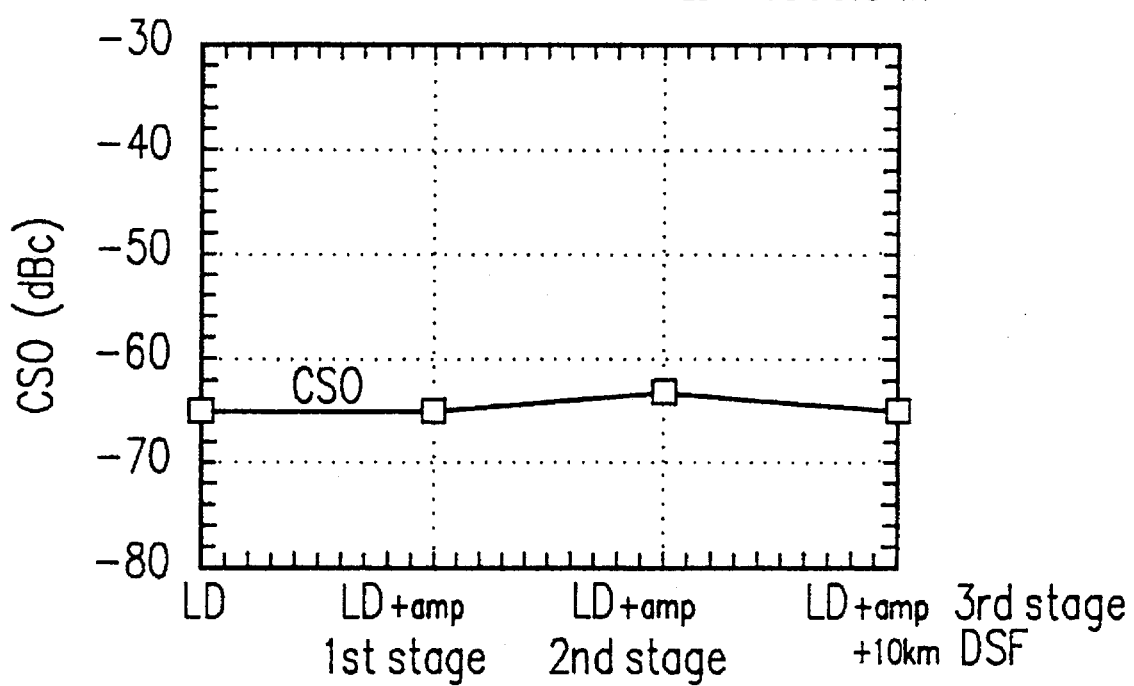
FIG. 9 is a graph showing the distortion generated by the optical fiber transmission system of FIG. 8.

FIG. 9 shows the distortion generated by each of the optical fiber amplifiers 20-1 to 20-3 connected in series. As is observed in FIG. 9, a significantly low distortion (CSO) of −65 dBc was obtained after the transmission through the three optical fiber amplifiers.

EXAMPLE 5

Another optical signal amplification apparatus as the fifth example according to the present invention will be described with reference to FIGS. 10 to 12.

The optical signal amplification apparatus of this example is used for a multi-distribution analog optical fiber transmission system of 1550 nm band.

Figure 10:
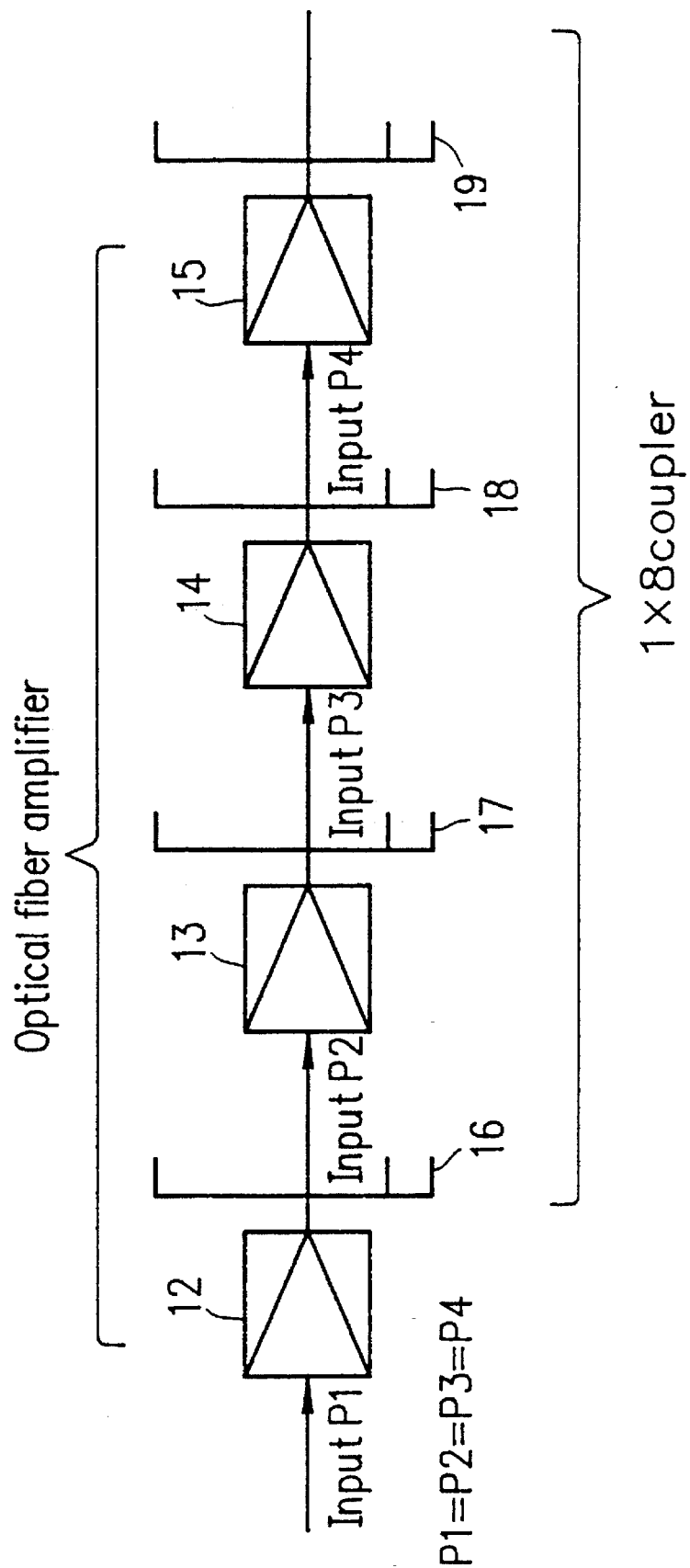
FIG. 10 is a block diagram of another optical signal amplification apparatus according to the present invention.

Referring to FIG. 10, the optical signal amplification apparatus includes a plurality of optical fiber amplifiers 12, 13, 14, and 15 connected in series and 1×8 optical couplers 16, 17, 18, and 19 disposed between the adjacent optical fiber amplifiers 12 to 15. In this example, with a total of four optical fiber amplifiers connected in series, approximately 4000-branched distributions are possible.

Each of the optical fiber amplifiers 12 to 15 has the same configuration as the optical fiber amplifier 20 of FIG. 2 shown in Example 1. Signal light emitted from a semiconductor laser is first amplified by the optical fiber amplifier 12 and then branched by the 1×8 coupler 16. This operation is repeated by the optical fiber amplifiers 13 to 15 and the 1×8 couplers 17 to 19 so as to effect multi-distribution. Powers P1, P2, P3, and P4 input into the optical fiber amplifiers 12 to 15, respectively, are substantially the same.

Each of the optical fiber amplifiers 12 to 15 includes two light sources for exciting (bidirectional excitation) so as to obtain low-noise signal light with high output. The power of pumping light emitted from the light sources was set at 100 mW. An optical fiber of each of the optical fiber amplifiers 12 to 15 has a length of 59 m, and is doped with erbium ions with a concentration of 240 ppm. In order to reduce the gain tilt, the erbium-doped optical fiber is also doped with 8000 ppm of aluminum.

As a light-receiving device, an InGaAs photodiode or an avalanche photodiode is generally used.

The inventors have analyzed the relationship between the gain tilt characteristic and the second-order distortion characteristic of the optical signal amplification apparatus of this example, so as to determine a wavelength band of signal light where a low distortion characteristic is obtained. The analysis will be described as follows.

The gain tilt characteristic of the optical fiber amplifier for light modulated to a radio frequency equal to or more than one MHz is different from that obtained by changing the wavelength of continuous light. The gain tilt for modulated light is expressed by:

$$Gtilt = \int \Gamma_s [(d\sigma_e/d\nu)N_{20} - (d\sigma_a/d\nu)N_{10}] dz \quad (1)$$

wherein $\Gamma_s$ is the overlap integration of the signal light and the core of the erbium-doped optical fiber, $\sigma_e$ and $\sigma_a$ are the emission cross section and the absorption cross section for the wavelength of the signal light, respectively, $\nu$ is the frequency of the signal light, and $N_{20}$ and $N_{10}$ are the concentration of erbium ions at the high-level and low-level steady states, respectively. The second-order mutual modulation distortion generated by the optical fiber amplifier is obtained by multiplying the gain tilt by the degree of chirping:

$$IM2 = Gtilt * \Delta\nu \quad (2)$$

The smaller the gain tilt or the degree of chirping is, the smaller the second-order distortion is.

Figure 11:
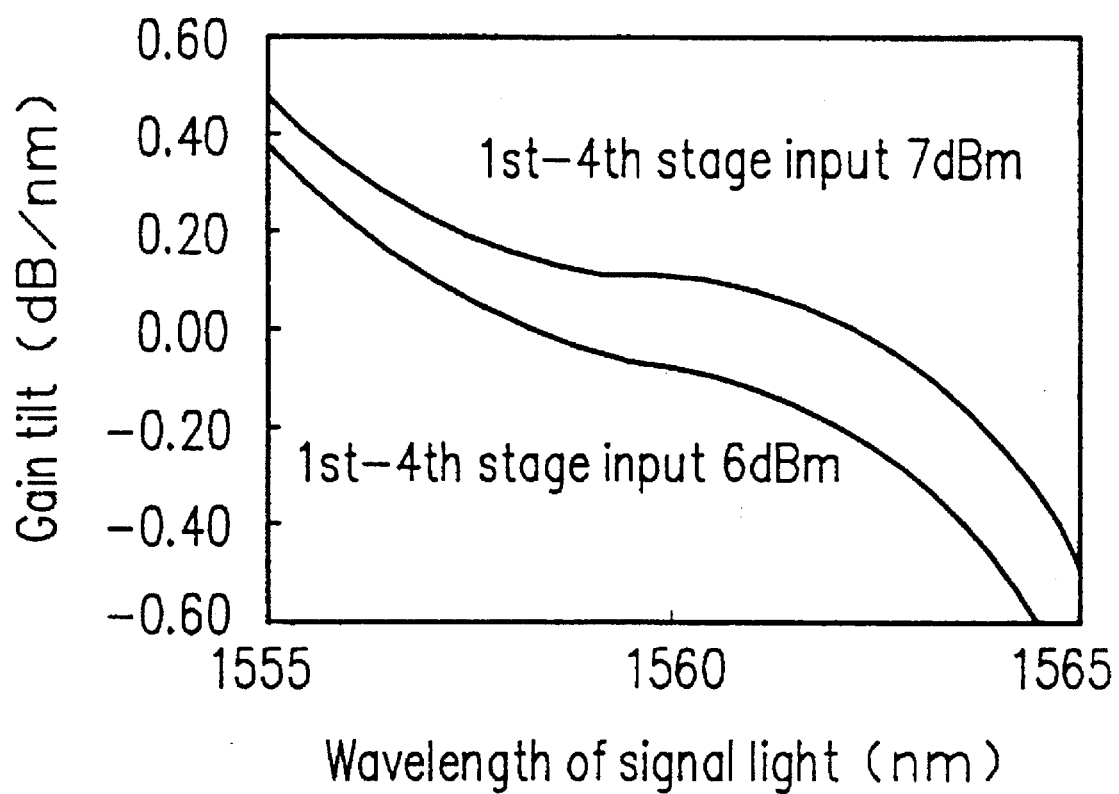
FIG. 11 is a graph showing the calculated results of the wavelength-dependency of the gain tilt of the optical signal amplification apparatus of FIG. 10.

FIG. 11 shows the calculated results of the wavelength-dependency of the gain tilt of the optical signal amplification apparatus of FIG. 10. The calculation was conducted for two cases where the power of the signal light input into the optical fiber amplifiers 12 to 15 is 6 dBm and 7 dBm. The powers input to the respective optical fiber amplifiers 12 to 15 are the same. FIG. 12 shows the calculated results of the wavelength-dependency of the CSO distortion generated by the optical signal amplification apparatus when the signal light is modulated by an AM 11-channel analog signal with the modulation factor of 11.3%/ch. The number of composites is 3, and the degree of chirping per channel is 1.8 GHz.

Figure 12:
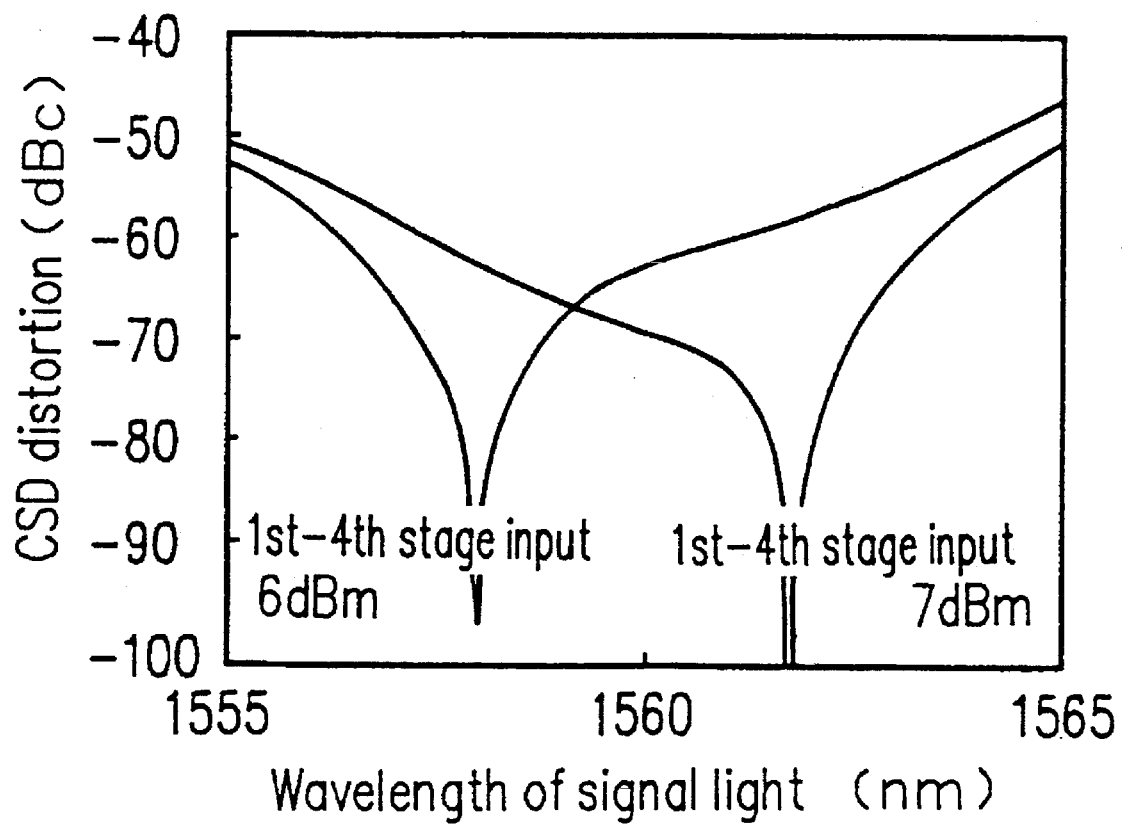
FIG. 12 is a graph showing the calculated results of the wavelength-dependency of the CSO distortion of the optical signal amplification apparatus of FIG. 10.

From FIGS. 11 and 12, the following are observed: when the absolute value of the gain tilt is greater, the CSO distortion becomes greater; but, the CSO distortion is not generated for a certain wavelength where the gain tilt is zero (1558 nm when the input signal light power is 6 dBm, and 1561.8 nm when it is 7 dBm). The CSO distortion of −60 dBc is specified as the requirement for AM image light transmission.

It is observed from FIG. 12 that the range of wavelengths of the signal light satisfying the requirement of CSO<−60 dBc for the CSO distortion is 1556.3 to 1561.5 nm when the input signal light power is 6 dBm, and 1557.5 to 1563.5 nm when it is 7 dBm. It is observed from FIG. 11 that these ranges of wavelengths correspond to the range of the absolute values of the gain tilt of 0.15 dB/nm or less. In other words, it has been found that a CSO distortion as low as −60 dBc or less can be realized by setting the wavelength of the signal light in the range of wavelengths where the absolute value of the gain tilt is 0.15 dB/nm or less.

EXAMPLE 6

Figure 13:
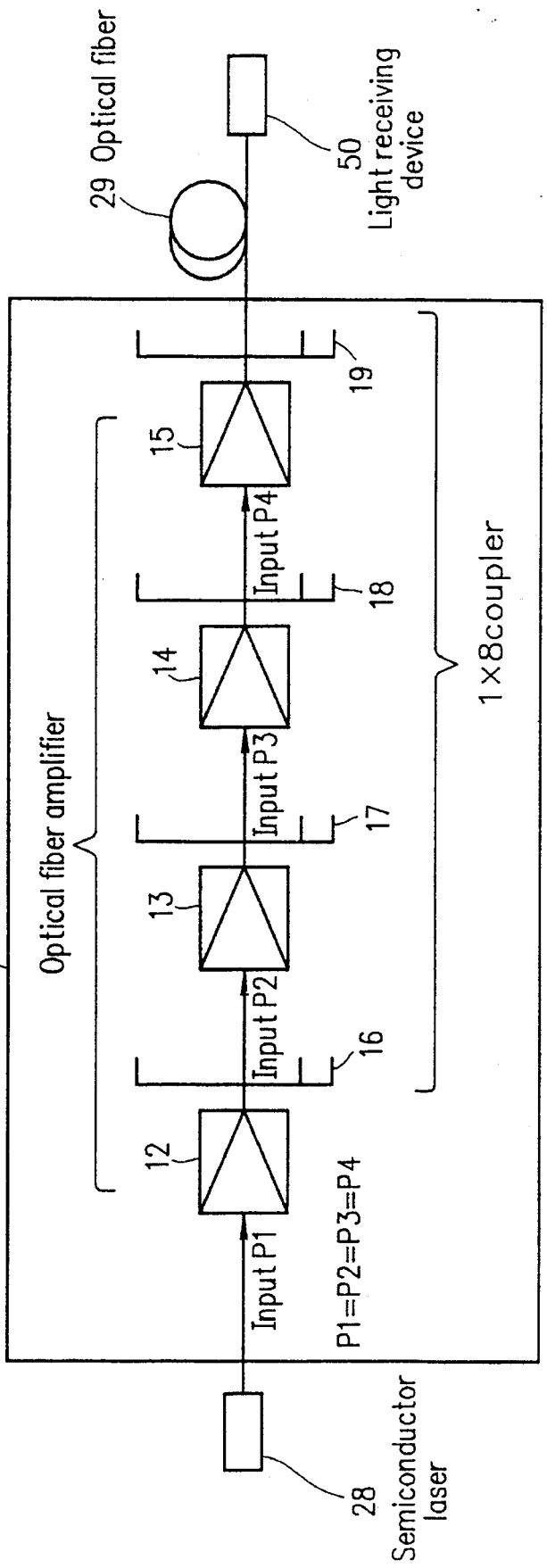
FIG. 13 is a block diagram of another optical fiber transmission system according to the present invention.
Figure 14:
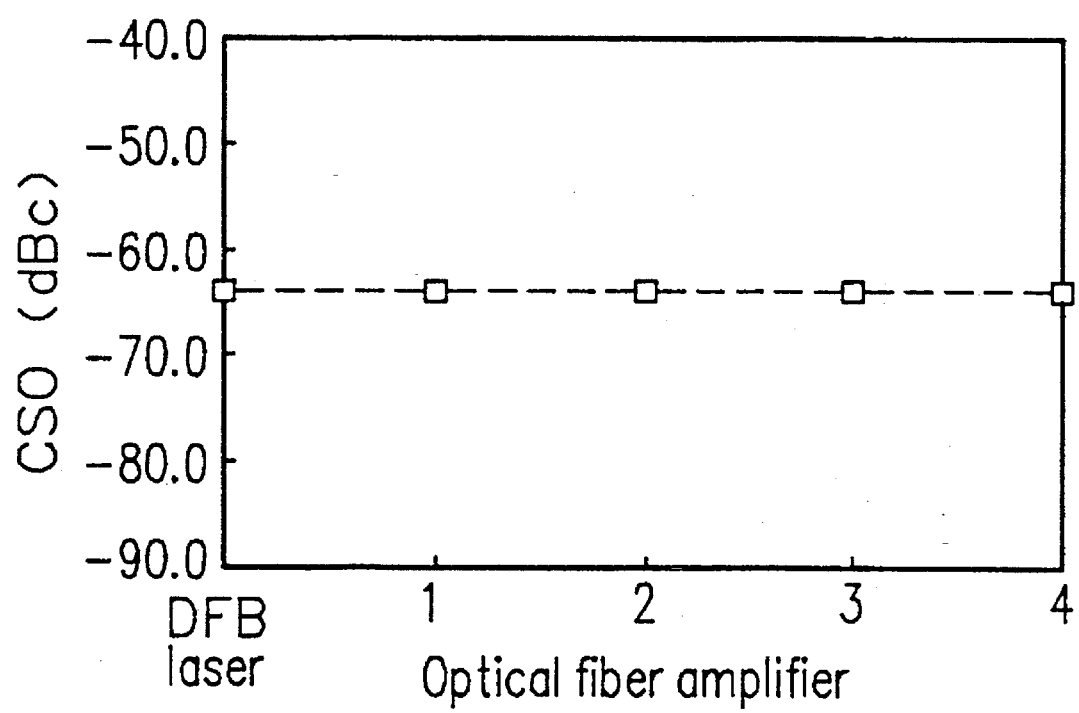
FIG. 14 is a graph showing the CSO distortion of the optical fiber transmission system of FIG. 13.

Another optical fiber transmission system as the sixth example according to the present invention will be described with reference to FIGS. 13 and 14.

An optical signal amplification apparatus 27 used for this example has the same configuration as that shown in the optical signal amplification apparatus of FIG. 10 described in Example 5. Signal light emitted from a DFB semiconductor laser 28 is amplified by the optical signal amplification apparatus, transmitted through an optical fiber 29, and then input into a light-receiving device 50. A DFB semiconductor laser emitting a laser beam having a wavelength of 1562 nm was used as the semiconductor laser 28. In the semiconductor laser 28, the threshold current was biased to be +54 mA, and the signal light was modulated by an AM 11-channel analog signal. The modulation factor was 11.3%/ch. The degree of chirping at this time was little dependent on the modulated frequency and was 1.8 GHz per channel.

Powers P1 to P4 of the signal light input into the optical fiber amplifiers 12 to 15 respectively were set at 7 dBm. FIG. 14 shows the CSO distortions generated by the semiconductor laser 28 and the respective optical fiber amplifiers 12 to 15. It is observed from FIG. 14 that the CSO distortion, −64 dBc, generated by the semiconductor laser 28 was retained after the amplification by the four optical fiber amplifiers 12 to 15, so that analog transmission with a low distortion of −60 dBc or less can be realized. This is because, since the gain tilt of the optical signal amplification apparatus for the wavelength of 1562 nm band is close to zero as is shown in the calculated results of FIGS. 11 and 12, the CSO distortion is as low as −82 dBc.

EXAMPLE 7

Yet another optical signal amplification apparatus as the seventh example according to the present invention will be described with reference to FIGS. 15 to 17.

Figure 15:
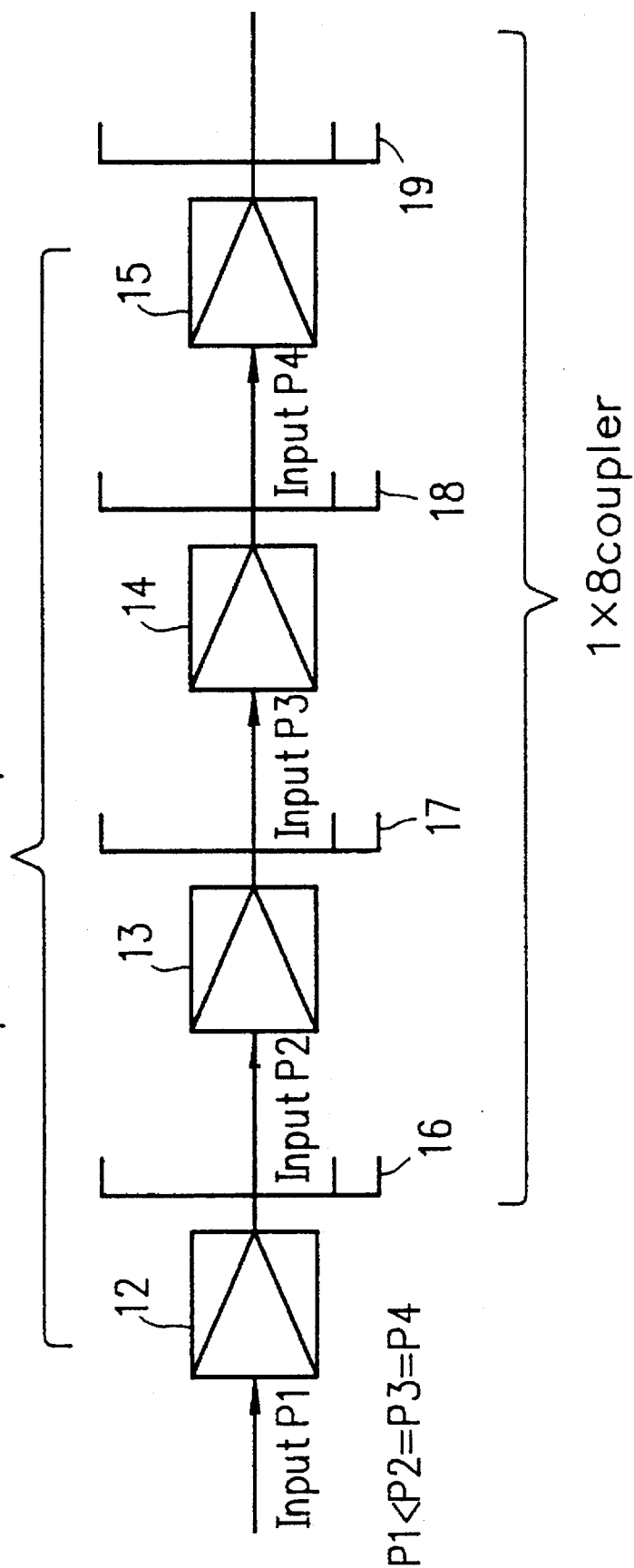
FIG. 15 is a block diagram showing yet another optical signal amplification apparatus according to the present invention.

The optical signal amplification apparatus of this example shown in FIG. 15 is different from that shown in FIG. 10 in that the power P1 of the signal light input into the first optical fiber amplifier 12 is smaller than the powers P2 to P4 of the signal light input into the second to fourth optical fiber amplifiers 13 to 15. by reducing the power of the signal light input into the first optical fiber amplifier, the bias current at the semiconductor laser for signal light can be made smaller, resulting in reducing the degree of chirping. As a result, the CSO distortion generated by the interaction of the gain tilt and the degree of chirping can be reduced.

Figure 16:
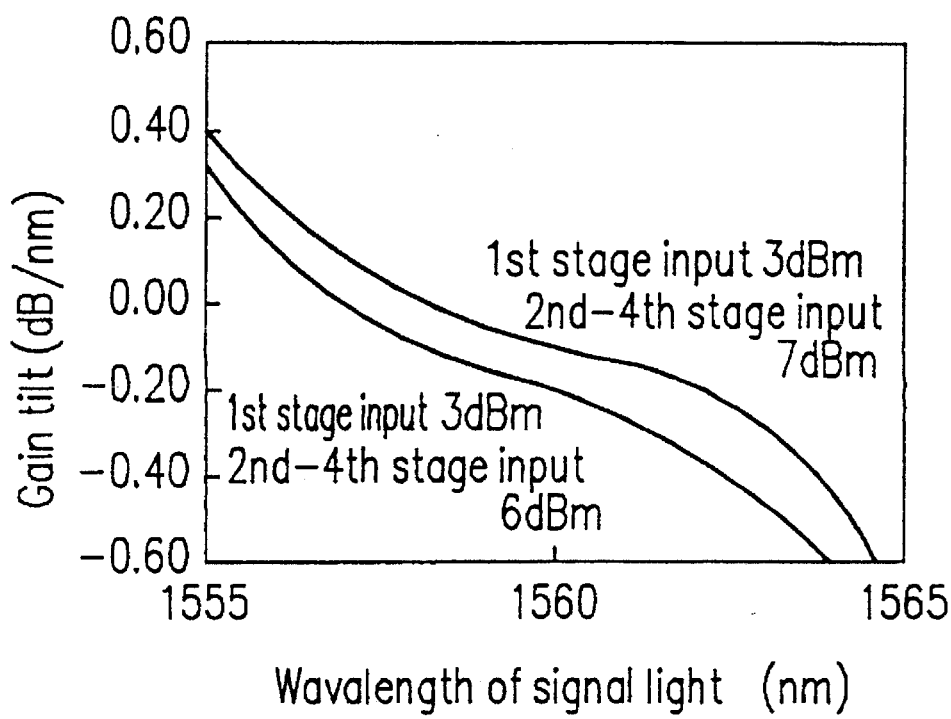
FIG. 16 is a graph showing the calculated results of the wavelength-dependency of the gain tilt of the optical signal amplification apparatus of FIG. 15.

FIG. 16 shows the calculated results of the wavelength-dependency of the gain tilt of the optical signal amplification apparatus of this example. The calculation was conducted for two cases where the power of the signal light input into the first optical fiber amplifier is 3 dBm while those input into the second to fourth optical fiber amplifiers are 6 dBm and 7 dBm, respectively. The powers input into the second to fourth optical fiber amplifiers are the same. FIG. 17 shows the calculated results showing the wavelength-dependency of the CSO distortion generated by the optical signal amplification apparatus when the signal light is modulated according to an AM 11-channel analog signal with the modulation factor of 11.3%/ch. The number of composites is 3, and the chirping per channel was set at 900 MHz.

Figure 17:
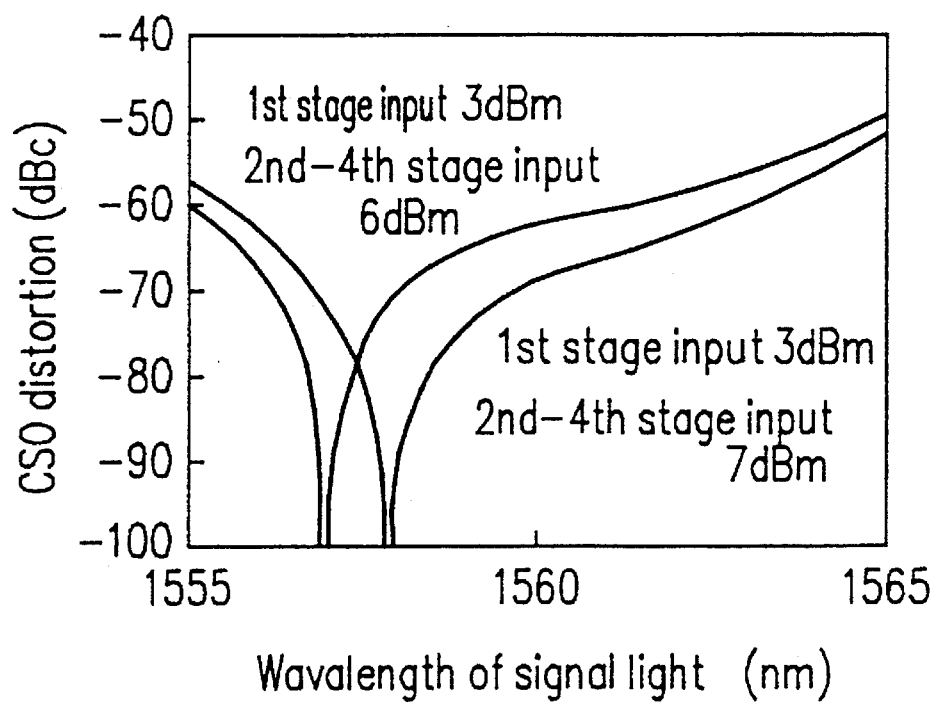
FIG. 17 is a graph showing the calculated results of the wavelength-dependency of the CSO distortion of the optical signal amplification apparatus of FIG. 15.

It is observed from FIG. 17 that the range of wavelengths of the signal light satisfying the requirement of −60 dBc specified for the CSO distortion for AM image light transmission is 1555 to 1562 nm when the power is 6 dBm, and 1555.3 to 1563.2 nm when it is 7 dBm. It is observed from FIG. 16 that these ranges of wavelengths correspond to the range of the absolute values of the gain tilt of 0.3 dB/nm or less. In other words, it has been found that, in this example, a CSO distortion as low as −60 dBc or less can be realized by setting the wavelength of the signal light in the range of wavelengths where the absolute value of the gain tilt is 0.3 dB/nm or less. In a comparison of FIG. 17 with FIG. 12, it is found that the wavelength of the signal light where the CSO distortion is not generated can be controlled by changing the power of the signal light input into one of a plurality of optical fiber amplifiers connected in series from others.

EXAMPLE 8

Yet another optical fiber transmission system as the eighth example according to the present invention will be described with reference to FIGS. 18 and 19.

Figure 18:
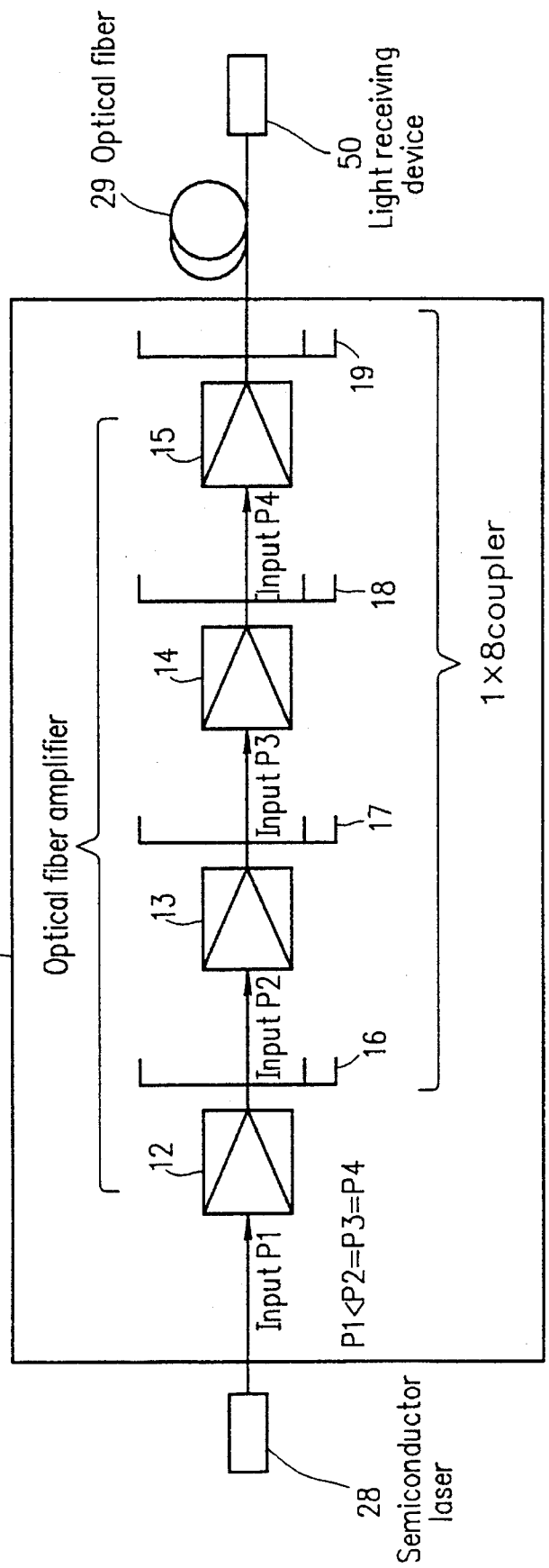
FIG. 18 is a block diagram of yet another optical fiber transmission system according to the present invention.

Referring to FIG. 18, the optical fiber transmission system of this example includes an optical signal amplification apparatus 31 which is the same as that of FIG. 15 described in Example 7, a DFB semiconductor laser 28 having an oscillation wavelength of 1562 nm, an optical fiber 29 for transmission, and a light-receiving device 50. In the semiconductor laser 28, the threshold current was biased to be +27 mA, and the signal light was modulated according to an AM 11-channel analog signal. The modulation factor was 11.3%/ch. The degree of chirping at this time is 900 MHz per channel which is smaller than that obtained by the optical fiber transmission system of Example 6 because the bias current is smaller. The power of the signal light input into the first optical fiber amplifier was 3 dBm, while those input into the second to fourth optical fiber amplifiers were 7 dBm.

Figure 19:
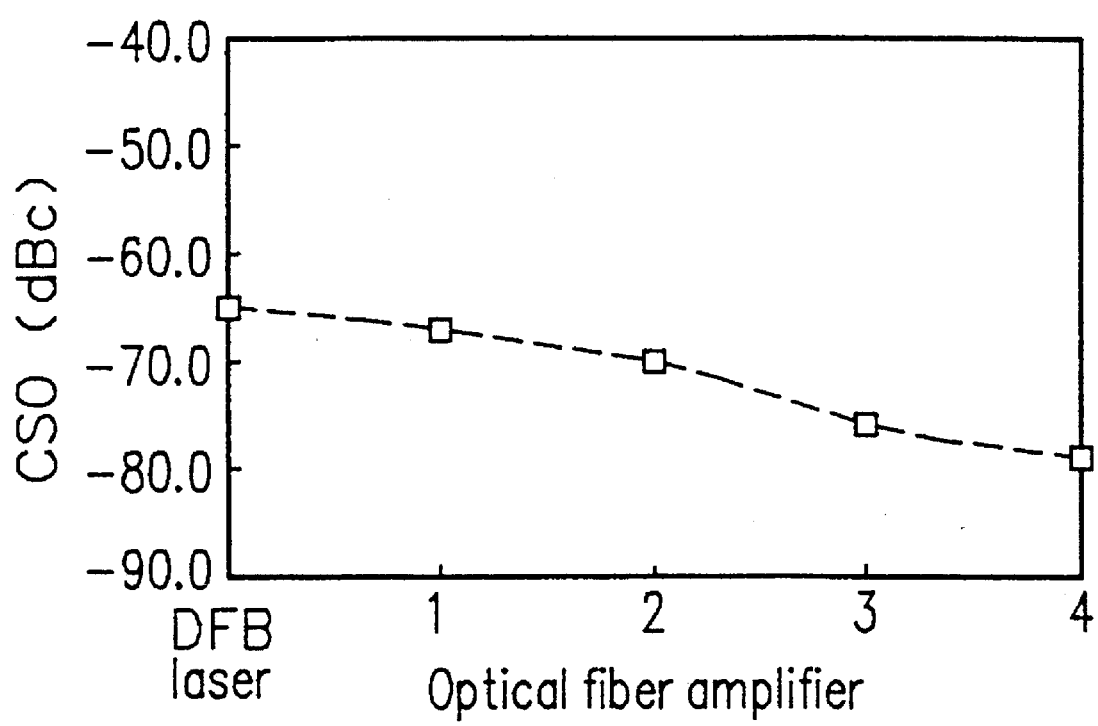
FIG. 19 is a graph showing the CSO distortion of the optical fiber transmission system of FIG. 18.
Figure 20:
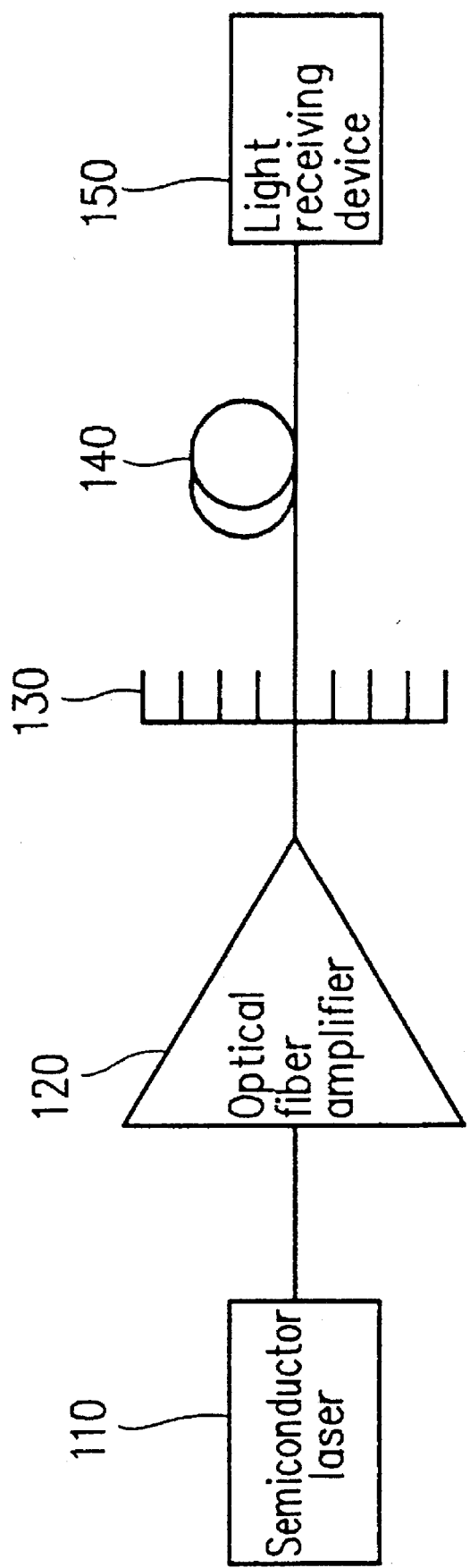
FIG. 20 is a block diagram showing a conventional optical signal amplification apparatus.

FIG. 19 shows the CSO distortions generated by the semiconductor laser 28 and the respective optical fiber amplifiers 12 to 15. As is observed from FIG. 19, the CSO distortion generated by the semiconductor laser 28 which is −65 dBc gradually decreases as the signal light is amplified by the optical fiber amplifiers 12 to 15, and as a result analog transmission with a significantly low distortion of −80 dBc which is close to the bottom limit of detection can be realized. This low distortion characteristic was possible because, though the CSO distortion of the optical signal amplification apparatus for the wavelength of 1562 nm is −65 dBc which is in the same level as that generated by the semiconductor laser, the two distortions which are of reverse phases are cancelled by each other.

In the optical signal amplification apparatus of Example 7 and the analog optical fiber transmission system of Example 8, the power of the signal light input into one of the optical fiber amplifiers connected in series was changed. Similar effects can also be obtained by changing the length of the erbium-doped optical fiber, the concentration of the erbium ions, or the power of the pumping light of one of the optical fiber amplifiers. The NF (noise factor) of the optical fiber amplifier can be reduced by reducing the length of the erbium-doped optical fiber, reducing the concentration of erbium ions, or increasing the power of the pumping light. The NF of the first optical fiber amplifier among a plurality of optical fiber amplifiers constituting an optical signal amplification apparatus is most influential to the NF of the optical signal amplification apparatus. Therefore, an optical fiber transmission system with low noise can be realized by using an optical fiber amplifier with low noise as the first-stage amplifier.

In the above examples, erbium was used as the dopant to the optical fiber, and the oscillation wavelength at the semiconductor laser was in the 1550 nm band. Similar effects were also obtained when praseodymium (Pr) was used as the dopant and the oscillation wavelength at the semiconductor laser was in the 1300 nm band.

Thus, according to one optical signal amplification apparatus of the present invention, it is possible to suppress a distortion component generated by a variation in the power of the signal light which has been caused by the variation in the frequency of the signal light because of the wavelength-dependency of the gain of the optical fiber amplifier. Accordingly, the distortion characteristic is not lowered even when the device includes a plurality of optical fiber amplifiers connected in series.

According to the optical fiber transmission system of the present invention, it is possible to achieve multi-distribution analog light transmission with low distortion where signal light analog-modulated by a multi-channel image signal and the like is emitted from a semiconductor laser and transmitted through a plurality of optical fiber amplifiers connected in series, a plurality of couplers, and an optical fiber.

The above transmission system can be applied to multi-distribution systems such as an optical CATV and a FTTH (Fiber To The Home), and thus is expected to greatly contribute to the realization of such systems.

According to another optical signal amplification apparatus of the present invention, the second-order distortion generated by the interaction of the gain tilt and the chirping can be reduced by setting the wavelength of the signal light in the wavelength band where the gain tilt for modulated light is small. This makes it possible to realize multi-distribution or long-distance analog light transmission with low distortion.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical signal amplification apparatus having a plurality of optical fiber amplifiers connected in series, each optical fiber amplifier comprising:

an optical fiber doped with rare earth ions; and a pumping light source for emitting pumping light for exciting the optical fiber, wherein the power of signal light input into each optical fiber amplifier is set so that the value of a distortion component of the signal light output from the optical fiber amplifier is equal to the value of a distortion component of the signal light input into the optical fiber amplifier and that the distortion component of the signal light output from the optical fiber amplifier increases when the power of the signal light input into the optical fiber amplifier increases, wherein the signal light has a chirping, and the distortion component is generated by the chirping and a gain tilt of the optical fiber doped with rare earth ions.

2. An optical signal amplification apparatus according to claim 1, wherein each optical fiber amplifier comprises a variable power adjuster connected to at least the input of the optical fiber amplifier, and the variable power adjuster adjusts the power of the signal light to be input into the optical fiber amplifier.

3. An optical signal amplification apparatus according to claim 1, wherein the signal light is laser light obtained by modulating light in a distributed feedback semiconductor laser with an oscillation wavelength of 1550 nm band using an analog signal current, and the optical fiber is doped with erbium ions as the rare earth ions.

4. An optical signal amplification apparatus according to claim 1, wherein each optical fiber amplifier further comprises a wavelength coupler disposed between the optical fiber and the pumping light source for optically coupling the pumping light with the optical fiber.

5. An optical signal amplification apparatus having a plurality of optical fiber amplifiers connected in series, each optical fiber amplifier comprising:

an optical fiber doped with rare earth ions; and a pumping light source for emitting pumping light for exciting the optical fiber, wherein the optical fiber is made of a fiber having an absorption cross section and an emission cross section where the differential coefficients of the wave-length-dependency curves of the absorption cross section and the emission cross section are substantially zero for a predetermined wavelength, the wavelength of the signal light is set to be the predetermined wavelength, and the signal light has a chirping.

6. An optical fiber transmission system comprising:

an optical fiber transmission route including the optical signal amplification apparatus according to claim 1;

a signal light generation device for emitting signal light in response to an analog signal current and inputting the signal light into the optical fiber transmission route; and a light-receiving device for converting the signal light into an electric signal, wherein the signal light emitted from the signal light generation device is transmitted through the optical fiber transmission route and then received by the light-receiving device.

7. An optical fiber transmission system comprising:

an optical fiber transmission route including the optical signal amplification apparatus according to claim 5;

a signal light generation device for emitting signal light in response to an analog signal current and inputting the signal light into the optical fiber transmission route; and a light-receiving device for converting the signal light into an electric signal, wherein the signal light emitted from the signal light generation device is transmitted through the optical fiber transmission route and then received by the light-receiving device.

8. An optical signal amplification apparatus having a plurality of optical fiber amplifiers connected in series, each optical fiber amplifier comprising:

an optical fiber doped with rare earth ions; and a pumping light source for emitting pumping light for exciting the optical fiber, wherein signal light input into each optical fiber amplifier has substantially the same power, and the wavelength of the signal light is in the range of wavelengths where the absolute value of a gain tilt of the optical signal amplification apparatus for modulated light which has a chirping is 0.15 dB/nm or less.

9. An optical signal amplification apparatus according to claim 8, wherein the optical fibers of the optical fiber amplifiers have substantially the same length and substantially same ion concentration and are excited by pumping light having substantially the same power.

10. An optical signal amplification apparatus according to claim 8, wherein at least one of the optical fiber amplifiers has a length or an ion concentration different from the other optical fiber amplifiers.

11. An optical signal amplification apparatus according to claim 8, wherein the power of pumping light input into at least one of the optical fiber amplifiers is different from that of pumping light input into the other optical fiber amplifiers.

12. An optical signal amplification apparatus according to claim 8, wherein the signal light is laser light of a 1550 nm band emitted from a semiconductor laser, and erbium is used for the rare earth ions doped in the optical fiber.

13. An optical signal amplification apparatus according to claim 8, wherein the signal light is laser light of a 1300 nm band emitted from a semiconductor laser, and praseodymium is used for the rare earth ions doped in the optical fiber.

14. An optical signal amplification apparatus having a plurality of optical fiber amplifiers connected in series, each optical fiber amplifier comprising:

an optical fiber doped with rare earth ions; and a pumping light source for emitting pumping light for exciting the optical fiber, wherein the signal light input into at least one of the optical fiber amplifiers has a power different from that of the signal light input into the other optical fiber amplifiers, and the wavelength of the signal light is in a range of wavelengths where the absolute value of a gain tilt of the optical signal amplification for modulated light which has a chirping is 0.3 dB/nm or less.

15. An optical signal amplification apparatus according to claim 14, wherein the optical fibers of the optical fiber amplifiers have substantially the same length and substantially the same ion concentration and are excited by pumping light having the substantially the same power.

16. An optical signal amplification apparatus according to claim 14, wherein the optical fiber of at least one of the optical fiber amplifiers has a length or an ion concentration different from the optical fibers of the other optical fiber amplifiers.

17. An optical signal amplification apparatus according to claim 14, wherein the power of pumping light input into at least one of the optical fiber amplifiers is different from that of pumping light input into the other optical fiber amplifiers.

18. An optical signal amplification apparatus according to claim 14, wherein the signal light is laser light of a 1550 nm band emitted from a semiconductor laser, and erbium is used for the rare earth ions doped in the optical fiber.

19. An optical signal amplification apparatus according to claim 14, wherein the signal light is laser light of a 1300 nm band emitted from a semiconductor laser, and praseodymium is used as the rare earth ions doped inn the optical fiber.

20. An optical fiber transmission system comprising:

a semiconductor laser for emitting signal light intensity-modulated by a multi-channel analog electric signal;

an optical signal amplification apparatus according to claim 8 for amplifying the signal light emitted from the semiconductor laser;

an optical fiber for transmitting the signal light amplified by the optical signal amplification apparatus; and a light-receiving device for converting the signal light transmitted through the optical fiber into an electric signal.

21. An optical fiber transmission system comprising:

a semiconductor laser for emitting signal light intensity-modulated by a multi-channel analog electric signal;

an optical signal amplification apparatus according to claim 14 for amplifying the signal light emitted from the semiconductor laser;

an optical fiber for transmitting the signal light amplified by the optical signal amplification apparatus; and a light-receiving device for converting the signal light transmitted through the optical fiber into an electric signal.

22. An optical signal amplification apparatus according to claim 1, wherein the signal light is emitted from a semiconductor laser, and the signal light is analog-modulated by controlling a current for driving the semiconductor laser.

23. An optical signal amplification apparatus according to claim 5, wherein the signal light is emitted from a semiconductor laser, and the signal light is analog-modulated by controlling a current for driving the semiconductor laser.

24. An optical signal amplification apparatus according to claim 8, wherein the signal light is emitted from a semiconductor laser, and the signal light is analog-modulated by controlling a current for driving the semiconductor laser.

25. An optical signal amplification apparatus according to claim 14, wherein the signal light is emitted from a semiconductor laser, and the signal light is analog-modulated by controlling a current for driving the semiconductor laser.

* * * * *

UNITED STATES PATENT AND TRADEMARK OFFICE
CERTIFICATE OF CORRECTION

PATENT NO. : 5,530,583
DATED : June 25, 1996
INVENTOR(S) : Tomoaki Uno et al.

It is certified that error appears in the above-indentified patent and that said Letters Patent is hereby corrected as shown below:

Title page, item [56], insert the reference 5,111,334    5/1992   Heidemann .............. 359/341

Column 17, line 35, delete "inn" and insert --in--.

Signed and Sealed this

Twenty-ninth Day of October 1996

Attest:

BRUCE LEHMAN

*Attesting Officer*      *Commissioner of Patents and Trademarks*